July 25, 1950  J. E. ENGLESSON  2,516,191
PACKING FOR ROTATABLE SURFACES
Filed Feb. 17, 1945  2 Sheets-Sheet 1
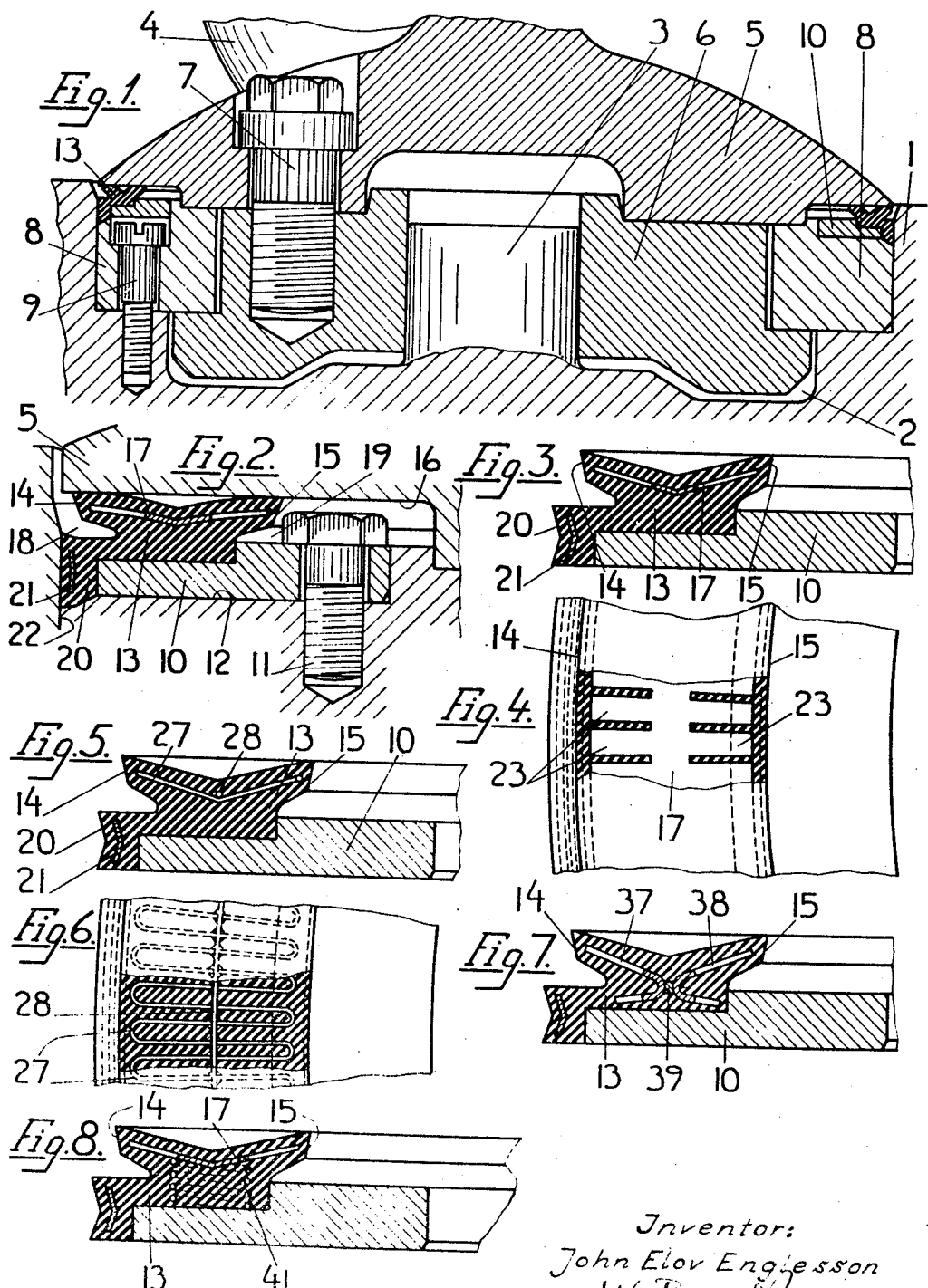
Inventor:
John Elov Englesson
per W. Bayard Jones
Attorney

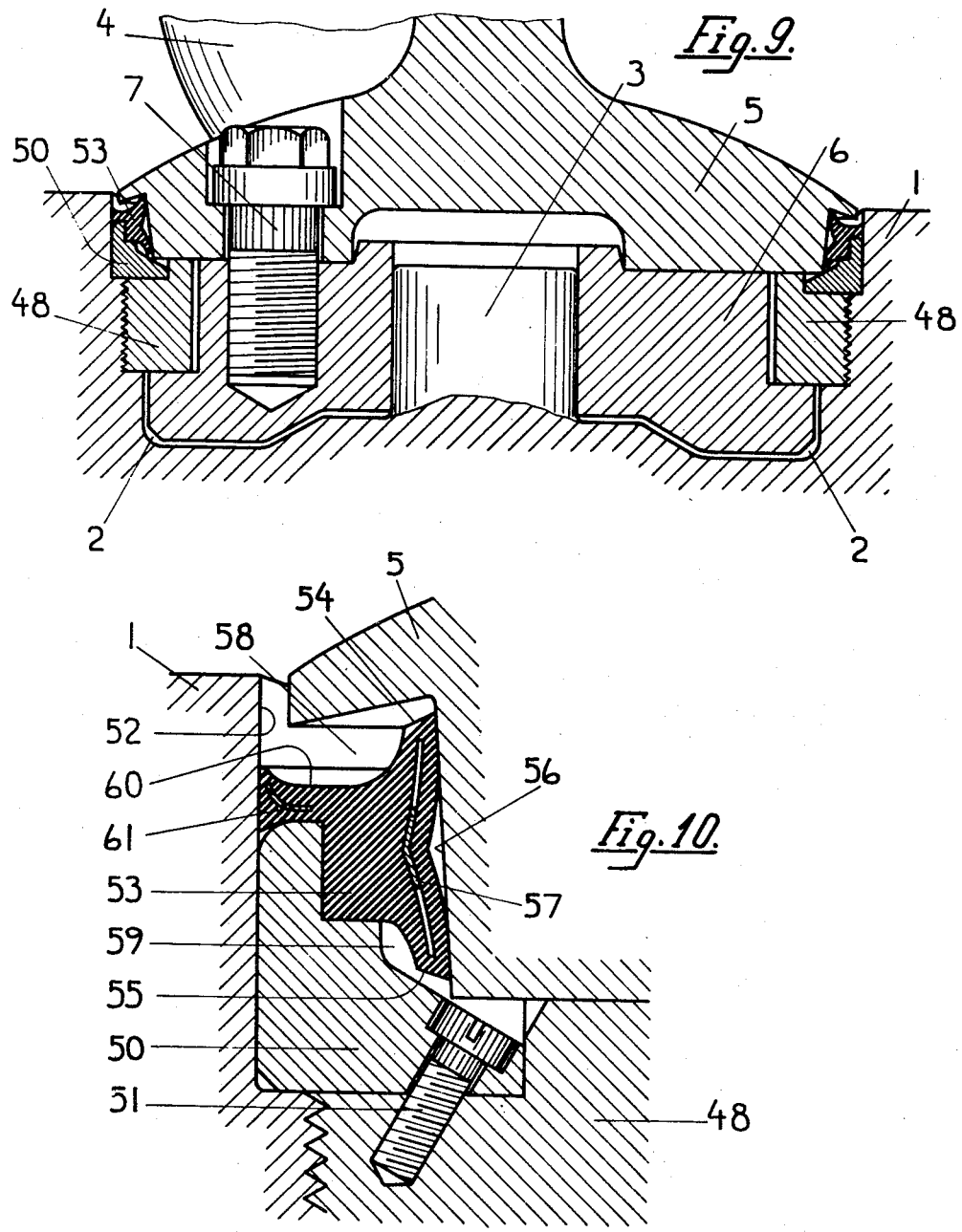

Patented July 25, 1950

2,516,191

UNITED STATES PATENT OFFICE 2,516,191

PACKING FOR ROTATABLE SURFACES

John Elov Englesson, Kristinehamn, Sweden

Application February 17, 1945, Serial No. 578,460
In Sweden September 15, 1943

3 Claims. (Cl. 286—11.13)

This invention relates to improvements in packings of the kind which are particularly adapted for use in the sealing of adjustable blades which are rotatably journalled in an oil-filled space in the hub body of water turbines, ship's propellers, pumps, or similar machinery operating in water, the packing serving to prevent the oil in the hub from leaking out of the said space in the hub and to prevent the outside water from penetrating into the said space in the hub. Heretofore it was necessary to make packings of this type rather complicated in order to make them fully efficient, and for this reason such packings were comparatively expensive.

It is an object of the present invention to provide a considerably simplified and yet efficient construction of such packings. With this purpose in view the present invention provides a packing which mainly comprises sealing means positioned between sealing surfaces on the hub body and on the rotatable blade which sealing surfaces are concentric to the axis of rotation of said blade in said hub body, said sealing means comprising a metallic supporting ring cooperating with one of said sealing surfaces, and a sealing ring of flexible material, such as synthetic rubber or the like, the body portion of which is united with, for instance vulcanized to, the said supporting ring. The sealing ring is provided with at least two annular sealing lips which diverge from the body portion of the sealing ring towards the second sealing surface, the outer edge portions of said sealing lips remote from said body portion contacting with the said second sealing surface to provide a fluid-tight seal therewith. A resilient reinforcing element is embedded within said sealing ring and the sealing lips thereof and serves to flexibly resist deflection of said sealing lips in a direction away from the second sealing surface with which they cooperate. Preferably, the said reinforcing element has a cross-sectional configuration conforming substantially to that of the sealing lips.

When the sealing means is placed in position between the sealing surfaces on the hub body and rotatable blade, the sealing lips on the sealing ring as well as the resilient reinforcing element embedded therein will be somewhat deflected in a direction towards the body portion of the sealing ring. It will be understood, therefore, that the sealing lips will be maintained in engagement with the cooperating sealing surface not only due to the elasticity of the material of said sealing lips but also due to the resiliency of the reinforcing element, which is of particular importance in view of the fact that synthetic rubber loses its elasticity to a certain extent after a certain length of time. In addition, the said sealing lips will be forced into engagement with the cooperating sealing surface by the pressure of the water acting on the outer sealing lips and by the pressure of the oil in the space in the hub body acting on the inner sealing lip. The reinforcing element being completely embedded within the sealing ring, the said element is fully protected from the action of the water, and in view of this fact it is unnecessary to make the said element of an expensive corrosion resistant metal or alloy. The invention, therefore, provides an efficient packing which may be cheaply manufactured.

The accompanying drawings illustrate by way of example a few constructional forms of the present invention. Fig. 1 shows a section through a portion of the hub of a ship's propeller and of a blade rotatably journalled therein, a packing according to the invention being provided between said hub and said blade. Fig. 2 shows to a larger scale a section of the sealing ring and adjacent parts of the hub and blade, while Fig. 3 shows a section of the sealing ring with its associate supporting ring before the said rings are placed in the hub. Fig. 4 shows a fractional plan view, partly in section, of the sealing ring shown in Fig. 3. Fig. 5 shows a section similar to Fig. 3 of a modified construction of the sealing ring, and Fig. 6 shows a fractional plan view, partly in section, of the sealing ring illustrated in Fig. 5. Fig. 7 shows a section similar to Fig. 3 of a third constructional form of a sealing ring, and Fig. 8 shows in a similar manner a section of a further development of the sealing ring shown in Figs. 2 and 3. Fig. 9 shows a section similar to Fig. 1 through a portion of the hub of a ship's propeller wherein a packing according to a further constructional form of the present invention is used between said hub and a blade rotatably journalled therein, and Fig. 10 shows to a larger scale a section through the sealing ring and adjacent parts of the hub and blade illustrated in Fig. 9.

Referring to the constructional form illustrated in Figs. 1 to 4 inclusive, the reference numeral 1 denotes the hub body of an adjustable ship's propeller, said hub body being provided with a recess 2 for each adjustable propeller blade rotatably journalled therein. Provided in said recess 2, which is filled with oil, is a pivot or trunnion 3 which serves as a turning pivot for the propeller blade 4 which is provided with a flange 5. Placed in the recess 2 around the pivot 3 is a ring 6 to which the flange 5 of the propeller blade is secured by means of a number of heavy screw bolts 7. The said ring 6 is provided in a well-known manner with a crank pin, not shown in the drawing, for turning the ring 6 and thus the propeller blade 4 about the pivot 3. The ring 6 is retained in position by means of a clamping or retaining ring 8 which is secured to the hub body 1, as by means of a number of screw bolts 9. Upon adjustment of the blade 5 the members 4, 5 and 6 thus turn as a unit about the pivot 3 while the ring 8 remains stationary.

A supporting ring 10 of iron or other metal is attached by means of screws 11, Fig. 2, to the sealing surface 12 on the retaining ring 8 in the hub. United to the supporting ring 10, as by being vulcanized thereto, is the body portion of a sealing ring 13 which is made of synthetic rubber or the like. On the side opposite to the supporting ring 10 the sealing ring is provided with two annular sealing lips 14 and 15 which engage the sealing surface 16 on the flange 5 of the propeller blade 4. The sealing lip 14 is directed outwards from the axis of rotation of the propeller blade, and the sealing lip 15 is directed inwards towards the said axis of rotation. Both lips are slightly inclined to the plane perpendicular to the axis of rotation, so that the cross section of the said two lips has approximately the shape of a considerably flattened letter V with a large obtuse angle between its legs, as shown in Fig. 3.

Embedded within the rubber material of the sealing ring and the sealing lips thereof is an annular resilient reinforcing element which serves to support the said sealing lips 14 and 15 and increase the resiliency of the same. In the constructional form shown in Figs. 1 to 4 inclusive, the said reinforcing element consists of a ring 17 made of thin spring metal and which normally, that is, when not subjected to pressure, has the cross-sectional shape shown in Fig. 3, that is to say the shape of a flattened letter V the legs of which form an obtuse angle, said legs representing the edges of the ring 17. In order to increase the resiliency of the said edges of the ring 17 the outer and the inner edges of the ring may be divided by radial slots or the like into a plurality of resilient tabs or tongues 23, as shown in Fig. 4. The ring may be made in the form of a whole undivided ring, or it may be divided into several sections which together form a ring within the sealing ring.

When the supporting ring 10 with the sealing ring 13 united thereto is placed in position and the propeller blade is bolted to the ring 6 by means of the screw bolts 7, the sealing surface 16 on the flange 5 of the blade 4 will press against the annular edges of the two sealing lips 14 and 15, whereby said lips and the edges of the resilient reinforcing ring 17 embedded therein will be deflected in a direction towards the supporting ring 10, as shown in Fig. 2. It will be seen that in this way the said sealing lips 14 and 15 are held in snug contact with the sealing surface 16 on the flange 5, due not only to their own resiliency but also due to the spring action of the flexed edges of the ring 17. Furthermore, the outer sealing lip 14 is forced against the sealing surface 16 on the flange 5 by the pressure of the water outside the propeller hub which acts in the space 18 on the lower surface of said lip 14, as viewed in Fig. 2, and the inner sealing lip 15 is similarly forced against the sealing surface 16 by the pressure of the oil in the space 19 acting on the lower side of said lip 15, said space 19 being in communication with the oil-filled space 2 in the hub, as will be easily understood. In this way the packing provides an efficient oil-tight and water-tight seal. Since the annular reinforcing element or ring 17 is entirely embedded into and surrounded by the rubber, it may be made of ordinary spring steel.

The sealing ring 13 is further provided at its outer circumference with a flange 20 which is directed axially and which is united with the outer circumferential surface of the supporting ring 10. Before the sealing ring is inserted in position in the hub body, the said flange 20 has the shape shown in Fig. 3, that is, the cross section of the outer circumferential surface of said flange 20 has substantially the shape of a flattened letter V. Embedded within the flange 20 is a reinforcing element 21 which may be constructed in substantially the same manner as the reinforcing element 17 above described, that is to say, it may consist of a ring of a thin resilient metal having a slightly cupped or trough-like cross section, as illustrated in Fig. 3, and similarly, in order to improve the resiliency of the edges of the said ring they may be provided with slots or the like dividing said edges into a plurality of tabs or tongues in the same manner as above described in connection with the ring 17. When the sealing ring is placed in position in the hub, the flange 20 will of course be compressed between the circumferential surface of the supporting ring 10 and an opposed concentric cylindrical sealing surface 22, Fig. 2, in the hub body. Due to such compression the projecting edges or rims of the flange 20 and the edges of the reinforcing ring 21 are deflected, as illustrated in Fig. 2. It will be seen that in this way the flange 20 is maintained in good sealing contact with the opposed surface 22, and that the reinforcing ring 21 aids in maintaining such contact even if the synthetic rubber gradually loses its elasticity, so that the flange 20 effectively prevents the water outside the hub from gaining access to the supporting ring 10. It is not necessary, therefore, to make the said ring 10 of a high grade and expensive corrosion-resistant metal or alloy.

Figs. 5 and 6 illustrate a modified constructional form of the reinforcing element or ring which is embedded in the sealing ring 13 and in the sealing lips 14 and 15 thereof. In this case the reinforcing ring is formed of a flexible metal wire 27 bent in zigzag shape in such manner that the bends of the wire form the outer and inner edges of the ring, as illustrated in Fig. 5. Preferably, a wire 28 is soldered or welded to the turns of the said wire 27 intermediate the bends thereof. Also in this case the cross section of the ring has substantially the shape of a flattened V, as shown in Fig. 5, and it will be understood that the action of the ring will be substantially the same as that above described in connection with the ring 17 shown in Figs. 1–4.

Fig. 7 illustrates a further constructional form of the reinforcing element which is embedded in the sealing ring 13 and in the sealing lips 14 and 15 thereof. In this case the said reinforcing element consists of two rings 37 and 38 both of which are made of thin spring metal, and both of which have a cross section substantially of the shape of the letter V. These rings 37 and 38 are embedded in the sealing ring 13 in such manner that the bends of the rings are directed towards one another, whereby the cross sections of the two rings form together a figure of approximately the shape of the letter X. Also in this case the upper flanges or edges of the rings 37 and 38 are embedded in the lips 14 and 15, respectively, of the sealing ring 13, whereas the lower flanges or edges of the said rings are embedded in the body portion of the ring near the supporting ring 10. With this construction of the sealing ring the advantage is attained that the lower flanges of the reinforcing rings 37 and 38 provide resilient supports for the upper flanges of said rings, so that the latter will securely hold the lips 14 and 15 in engagement with the opposed sealing surface even if the material in the body portion and in the said lips of the sealing ring loses its elasticity. In other respects this construction corresponds to that illustrated in Fig. 3. The two rings 37 and 38 may be, but need not be, united to one another at the bends thereof, at 39, as by soldering or welding. As in the construction shown in Fig. 3, the edges of each ring 37 and 38 may be divided by radial slots or the like into a plurality of resilient tabs or tongues, to increase the resiliency of the edges of the rings.

Fig. 8 illustrates a further development of the sealing ring shown in Figs. 2 and 3, which shall serve the same purpose as that above described in connection with Fig. 7, namely, to ensure that the sealing lips 14 and 15 are maintained in engagement with the opposed sealing surface even if the material in the sealing ring loses its elasticity. As shown in Fig. 8, the reinforcing element which consists of a ring 17 having slotted edges, and which is embedded in the sealing ring 13 and in the sealing lips 14 and 15 thereof, as described in connection with Figs. 2 and 3, is supported by a suitable number of helical springs 41 which are embedded in the body portion of the sealing ring 13, and which are spaced at suitable distance from one another along the periphery of the sealing ring 13. In other respects this construction is similar to that above described in connection with Figs. 2 and 3.

In the constructional form illustrated in Figs. 9 and 10, the hub 1 with its oil-filled recess 2 and pivot or trunnion 3, as well as the propeller blade 4 with its flange 5 and the ring 6 secured thereto by means of screw bolts 7, are similar to the corresponding members above described in connection with Fig. 1, and for this reason the same reference numerals are used in Fig. 9 for the said members. As shown in Fig. 9, the retaining ring 48 is in this case attached to the hub body 1 by being screw-threaded therein. A supporting ring 50 is attached by means of screws 51 to the said retaining ring 48. A cylindrical outer surface on said supporting ring 50 cooperates with a corresponding cylindrical sealing surface 52 in the hub body 1. Also in this case the body portion of the sealing ring 53, which is made of synthetic rubber or the like, is united to the supporting ring 50, as by being vulcanized thereto. The sealing ring is provided with two annular sealing lips 54 and 55 which engage a cylindrical or slightly tapered sealing surface 56 on the flange 5 of the propeller blade. The sealing lip 54 is directed outwards, and the sealing lip 55 is directed inwards towards the interior of the hub. In this case, therefore, the said lips, as viewed in the cross section shown in Fig. 10, are directed more or less in the axial direction of the rotatable propeller blade.

Also in this case the cross section of the two lips has approximately the shape of a flattened letter V. An annular resilient reinforcing element is embedded in the sealing ring and in the sealing lips 54 and 55 thereof and serves to support the said sealing lips and to increase the resiliency of the same. The said ring may also in this case consist of a ring 57 of thin spring metal, the cross section of which has the shape of a flattened letter V, and the edges of which may be slotted in the manner above described in connection with the constructional form shown in Figs. 1 to 4, inclusive. It will be understood, however, that also with the construction shown in Fig. 9, the reinforcing element may be arranged in a similar way to that above described in connection with Figs. 5 and 6, or Fig. 7 or Fig. 8.

It will easily be understood that the sealing ring according to the construction shown in Figs. 9 and 10 operates in substantially the same manner as above described in connection with Figs. 1 to 4 inclusive, in that the reinforcing element 57 will maintain the sealing lips 14 and 15 in contact with the sealing surface 56 on the flange 5, and in addition, the pressure of the outside water acting in the space 58 on the outer side of the sealing lip 54, will force said lip against said sealing surface 56, while the pressure of the oil in the space 59 which communicates with the oil-filled space 2 in the hub, acts in a similar manner to force the lip 55 against the said sealing surface 56.

The sealing ring 53 is provided with an outer circumferential flange 60 which cooperates with the sealing surface 52 in the hub body to provide a fluid-tight seal therewith. Embedded in said flange 60 is a resilient reinforcing element 61, which may be constructed similarly to the reinforcing elements above described, and which aids to maintain the outer edge of said flange 60 in fluid-sealing relation to said surface 52.

The sealing surface 56 on the flange 45 of the propeller blade may, of course, be cylindrical but it is preferable to make the same slightly tapered or conical, as shown in the drawing, to facilitate the introduction of the flange 5 into the sealing ring.

It will be understood that the invention is not limited to the constructional forms above described and illustrated in the accompanying drawings and that various changes and modifications may be made therein within the scope of the following claims.

I claim:

1. A packing adapted for use as a sealing device between sealing surfaces relatively movable about an axis of rotation, said packing comprising in combination a metallic supporting ring adapted to cooperate with one of said sealing surfaces, a sealing ring of flexible material having a body portion united with said supporting ring, said sealing ring having a flange extending from said body portion thereof in a direction away from the second sealing surface, said flange being united with said supporting ring and covering the outer surface thereof to provide a seal for the joint between said supporting ring and said first sealing surface, said sealing ring having at least two annular sealing lips diverging from said body portion thereof towards the second sealing surface, the outer edge portions of said sealing lips remote from said body portion contacting with said second sealing surface to effect a fluid-tight seal therewith, and a resilient reinforcing element embedded within said sealing ring and said sealing lips thereof and adapted to flexibly resist deflection of said sealing lips in a direction away from said second sealing surface, said reinforcing element having a cross-sectional configuration conforming substantially to that of said sealing lips.

2. A packing adapted for use as a sealing device between substantially plane sealing surfaces relatively movable about an axis of rotation perpendicular to the plane of said surfaces, said packing comprising in combination a metallic supporting ring having a substantially plane surface adapted to cooperate with one of said sealing surfaces to effect a fluid-tight seal therewith, means for attaching said supporting ring to said sealing surface, a sealing ring of flexible material having a body portion united with said supporting ring, said sealing ring having an axially directed flange extending from said body portion thereof in a direction away from the second sealing surface, said flange being united with said supporting ring and covering the outer circumferential surface thereof to provide a seal for the joint between said supporting ring and said first sealing surface, a resilient reinforcing element embedded within said axially directed flange on said sealing ring, said sealing ring having at least two annular sealing lips diverging from said body portion thereof towards the second sealing surface, the outer edge portions of said sealing lips remote from said body portion contacting with said second sealing surface to effect a fluid-tight seal therewith, and a resilient reinforcing element embedded within said sealing ring and said sealing lips thereof and adapted to flexibly resist deflection of said sealing lips in a direction away from said second sealing surface, said reinforcing element having a cross-sectional configuration conforming substantially to that of said sealing lips.

3. A packing adapted for use as a sealing device between sealing surfaces relatively movable about an axis of rotation, said packing comprising in combination a metallic supporting ring adapted to cooperate with one of said sealing surfaces, a sealing ring of flexible material having a body portion united with said supporting ring, said sealing ring having a flange extending from said body portion thereof in a direction away from the second sealing surface, said flange being united with said supporting ring and covering the outer surface thereof to provide a seal for the joint between said supporting ring and said first sealing surface, said sealing ring having at least two annular sealing lips diverging from said body portion thereof towards the second sealing surface, the outer edge portions of said sealing lips remote from said body portion contacting with said second sealing surface to effect a fluid-tight seal therewith, and a resilient reinforcing element embedded within said sealing ring and said sealing lips thereof and adapted to flexibly resist deflection of said sealing lips in a direction away from said second sealing surface, said reinforcing element consisting of a ring formed of a flexible metal wire bent into zigzag shape in such manner that the bends of said wire form the outer and inner edges of said ring, said ring having a cross section substantially of the shape of a flattened letter V the legs of which form an obtuse angle.

JOHN ELOV ENGLESSON.

REFERENCES CITED

The following references are of record in the file of this patent:

UNITED STATES PATENTS

| Number | Name | Date |
|---|---|---|
| 1,866,580 | Schmitthenner | July 12, 1932 |
| 1,924,555 | Hubbard | Aug. 29, 1933 |
| 1,969,008 | Hubbard | Aug. 7, 1934 |
| 2,055,196 | Fuchs | Sept. 22, 1936 |
| 2,272,650 | Von Veh | Feb. 10, 1942 |
| 2,280,857 | Saffold | Apr. 28, 1942 |
| 2,387,182 | Procter | Oct. 16, 1945 |

FOREIGN PATENTS

| Number | Country | Date |
|---|---|---|
| 541,336 | Great Birtain | of 1941 |
| 544,881 | Great Britain | of 1942 |
| 545,437 | Great Britain | of 1942 |